④ United States Patent [15] 3,697,884
Fort et al. [45] Oct. 10, 1972

[54] SYNCHRONIZING A PHASE-LOCKED-LOOP FROM PHASE ENCODED SIGNALS

[72] Inventors: Larry W. Fort, Broken Arrow; Connie T. Marshall, Muskogee, both of Okla.

[73] Assignee: Telex Computer Products, Inc., Tulsa, Okla.

[22] Filed: July 16, 1971

[21] Appl. No.: 163,208

[52] U.S. Cl. ....................................331/1 A, 331/14
[51] Int. Cl. ...............................................H03b 3/04
[58] Field of Search ...........................331/1 A, 14, 25

[56] References Cited

UNITED STATES PATENTS 3,602,834 8/1971 McAuliffe..................331/1 A

*Primary Examiner*—John Kominski
*Attorney*—James R. Head et al.

[57] ABSTRACT

In this invention a voltage controlled oscillator provides an output signal which is a clock signal. This is synchronized with the incoming phase-encoded (PE) signal through a phase detector in a phase-locked-loop (PLL). To synchronize the clock signal to the PE signal both signals must be negative-going and positive-going at the same time. This invention corrects the PE signal to a synchronizing signal, by use of an inverting element, whenever the PE signal and clock are not changing in the same direction. A NAND gate connected to the synchronizing signal and the clock senses differences and controls a flip-flop, which inverts the PE signal.

3 Claims, 2 Drawing Figures

INVENTOR.
LARRY W. FORT
CONNIE T. MARSHALL
BY
Head & Johnson
ATTORNEYS

INVENTOR.
LARRY W. FORT
CONNIE T. MARSHALL
BY Head & Johnson
ATTORNEYS

SYNCHRONIZING A PHASE-LOCKED-LOOP FROM PHASE ENCODED SIGNALS

BACKGROUND OF THE INVENTION

1. Field of the Invention

This invention is in the field of phase-locked-loop systems, and particularly those which are used to set a clock frequency in synchronism with a phase-encoded signal. More particularly, this invention concerns the use of auxiliary means to provide a more dependable synchronization.

2. Prior Art

Phase-locked-loops are old in the art. They are used to synchronize a voltage controlled oscillator to an incoming alternating signal. A phase detector is used to detect small difference in phase. This generates an error voltage which controls the oscillator to remain in-phase.

These prior art devices are entirely adequate where the incoming signal is a substantially constant frequency alternating voltage, in which case the phase detector senses the times of zero crossings (say from positive to negative) and makes the necessary corrections.

However, there is one important type of signal, the phase-encoded (PE) signal, that requires a clock signal, but because of the nature of the PE signal, the conventional PLL cannot be used.

SUMMARY OF THE INVENTION

These limitations of the prior art devices are overcome in the present invention by a circuit which senses when the PE signal does not have a zero crossing in synchronizing with the clock signal, and automatically inverts the PE signal. By this means a derived signal, called a synchronizing signal, is prepared, which is a regular alternating signal. Thus the phase detector can now sense the small phase differences and provide the necessary error signals.

It is therefore an important object of this invention to provide means to convert a PE signal, that does not have zero crossings at equi-time positions, to a synchronizing signal that does have zero crossings at equi-time positions, so that a conventional PLL can synchronize a clock signal to the synchronizing signal.

These and other objects and a complete understanding of the principles of the invention will be evident from the following description taken in conjunction with the appended drawings, in which:

DESCRIPTION OF THE PREFERRED EMBODIMENT

Figure 1:
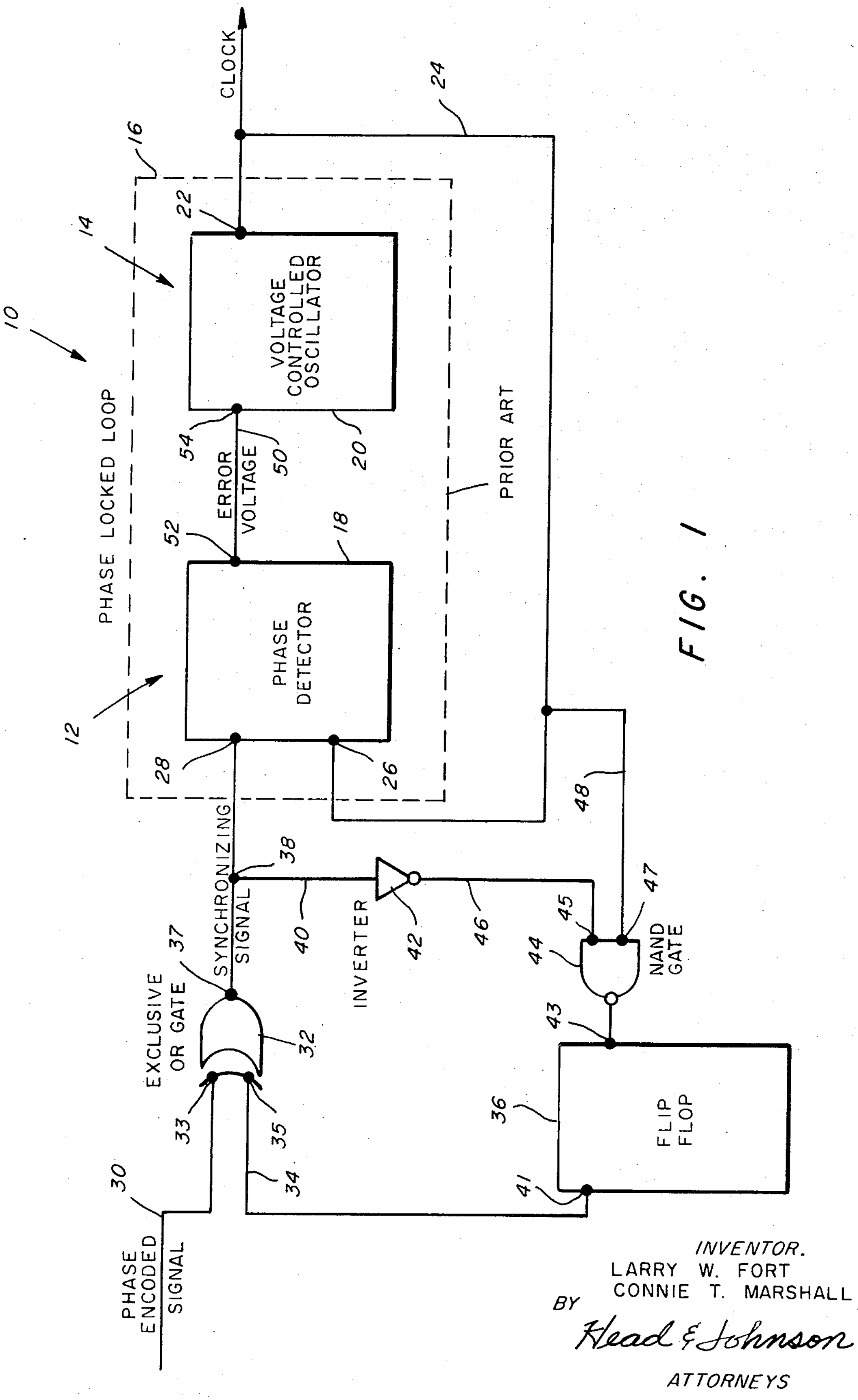
FIG. 1 represents one embodiment of this invention.

In FIG. 1 is shown a conventional phase-locked-loop indicated generally by the numeral 10. This PLL is enclosed in the dashed outline 16, and is indicated as prior art. This means that a conventional PLL can be used in this position. However, this invention is not limited to the conventional PLL designs, but may utilize other PLL systems, including those with the wide band voltage controlled oscillators, which is the subject matter of our copending application, Ser. No. 163,180, of which this application is included by reference in this application.

The PLL generally combines a phase detector 12 and a voltage controlled oscillator 14, the output of which at terminal 22 is an alternating voltage whose frequency is a function of an error voltage 50 applied to input terminal 54. The output signal is called the clock signal, and the purpose of the PLL is to vary the frequency of the oscillator 14 until its frequency is equal to the frequency of the synchronizing signal 38. A phase detector 12 has, as inputs, the synchronizing signal at 28 and the clock signal at 26. The two signals are "-generally" in phase. That is, they have zero crossings from negative to positive and vice versa, close to each other. Precise synchronization is provided by the PLL.

The operation of the phase detector and the PLL is well known in the art, and these electronic devices may be purchased on the market from a number of manufacturers including Motorola Semiconductor Products, Inc. of Phoenix, Arizona 85036. Therefore it is not deemed necessary to go into a detailed description of the circuits of the PLL since these details of construction and operation can be obtained from Motorola and other manufacturers.

Where the incoming signal to which the clock is to be synchronized is a regular alternating signal substantially constant period, or constant time interval between zero crossings, the PLL has no difficulty synchronizing the clock signal. However, there is very important class of signal called a phase-encoded (PE) signal which is not a regular alternating signal. This is shown in FIG. 2.

Figure 2:
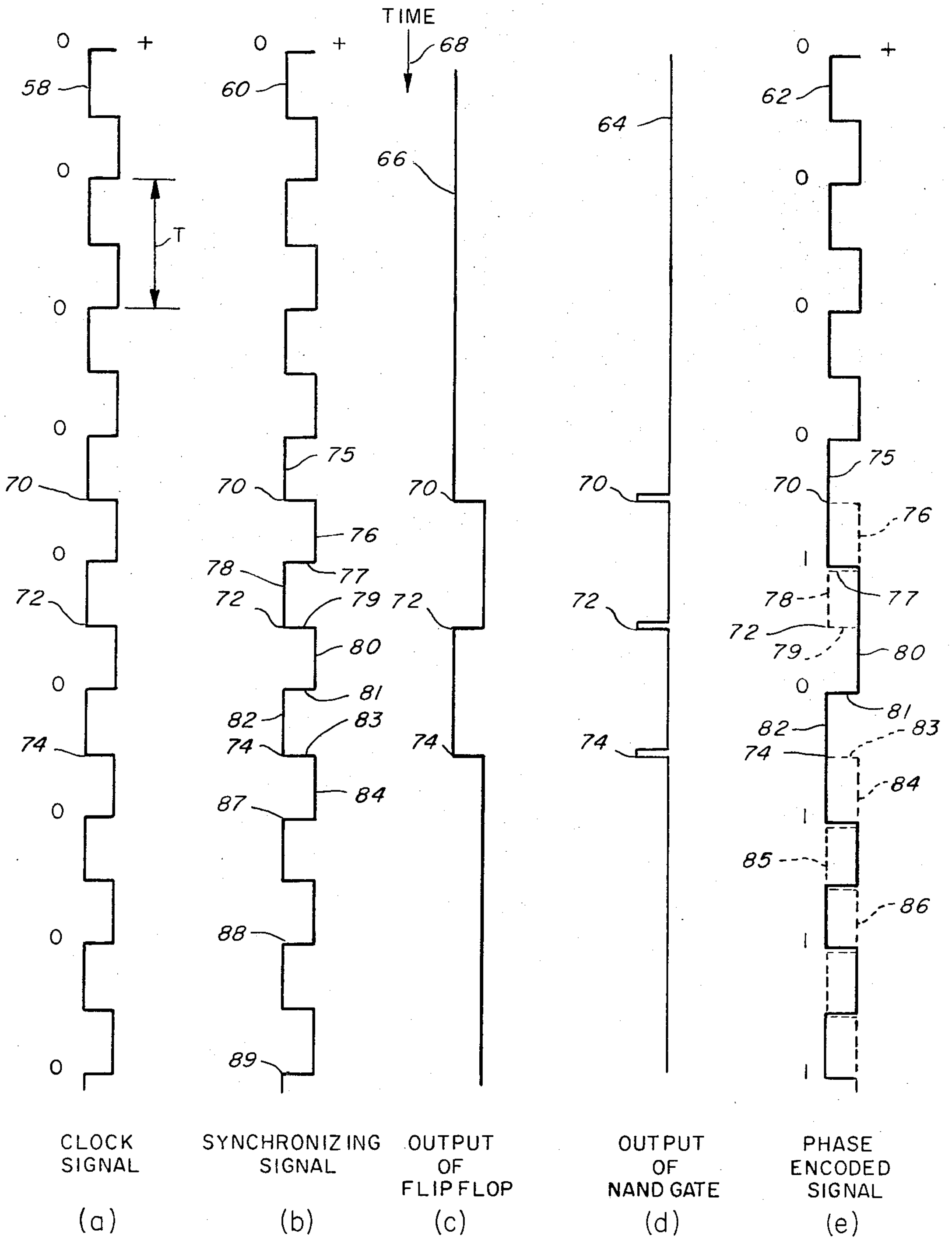
FIG. 2 shows the nature of the different signals involved in the embodiment of FIG. 1.

In FIG. 2 the clock signal 58 is shown in curve (a) as a square wave signal of uniform period T. The signal goes from positive potential to zero potential at equal intervals of time T. When the signal goes from + to 0 it is called the negative-going or zero-going time or zero time. At a point 180° later the signal goes positive again, etc. These 180° points are called phase times. Now, if the synchronizing signal 60, is as shown in (b), then the two signals are always basically in phase, and the PLL can maintain precise synchronizing between the two signals.

In curve (e) is shown a conventional phase-encoded signal 62. When the signal changes from + to 0 it denotes a "zero bit." When it changes from 0 to + it indicates a "one bit." Thus, the curve (e) indicates, from the top down the bits 0, 0, 0, 0, 1, 0, 1, 1, 1, etc. To decode this signal in (e) it is necessary to have a clock signal synchronized to the PE signal 62. Unfortunately the conventional PLL will not respond to the curve 62 since it does not have zero-going crossings at the same time as the clock signal. Therefore it is necessary to derive the synchronizing signal 60 from the PE signal 62. This is accomplished by the apparatus of FIG. 1.

In FIG. 1, the PE signal 30 goes to an exclusive OR gate 32. In this device, which is a well known commercial product, there are 2 input terminals 33, 35 and an output terminal 37. The PE signal goes to 33, and through the exclusive OR gate to 37. Normally the terminal 35 is kept at zero potential. When 35 goes to positive potential then the exclusive OR gate inverts the incoming signal 30. Thus, when 35 is +, 37 is the inverse (180° out of phase) of 33. When 35 drops to 0, then 37 is in phase with 33. The potential of 35 is controlled by flip-flop 36, which is controlled by the NAND gate 44 which at its two input terminals it senses the output of gate 32 inverted by 42, and the clock signal on line 24.

In the NAND gate 44, when the inputs 45 and 47 are both positive the output to 43 is zero. If either 45 or 47 is zero while the other is positive, 43 will be positive. When they are both positive, then 43 goes to zero and flips the flip-flop, and the potential of 41 goes +. This is the signal to the OR gate 32 to invert, etc.

Consider the curves (a), (b) and (e), FIG. 2. Down to point 70 they are all in phase. Just prior to point in time 70, all three are zero, indicating that the gate 32 is not inverting. So, the signal on 45 is high (inverted by 42), while the clock is low. Thus 43 is high and 41 is low. Now right at time 70, the clock (a) goes high, but (e) stays low. Thus 45 and 47 are both high and 43 goes low, 41 goes high and causes 32 to invert. Thus the curve (e) is modified to (b) by inverting at time 70, forming the segments 76, 77, 78, etc. Thus the derived signal (b) now follows (a) down to point 72. At point 72 the clock goes positive at 47, the curve (e) (shown positive) is actually negative because 32 is inverting, so signal 45 is positive. With both 45, 47 +, 43 is low causing another flip of the flip-flop and 35 becomes zero, and the OR gate 32 becomes uninverting.

This holds now till time 74, where the same condition exists as existed at 70. Gate 32 inverts and the curve (b) follows segments 83, 84, 85, 86 etc. Thus the derived curve (b) follows the PE curve (e) until there is a transition on curve (a) that is not matched by curve (e) and the exclusive OR gate 32 inverts to make (b) match (a). This holds until the next time a zero crossing is not matched by (a) and (e) and the PE signal is inverted back, etc.

Thus, it is clearly seen that the circuit of FIG. 1, as explained in connection with FIG. 2, will form the derived signal (b) from the PE signal (e) which will match the phase transitions of clock signal (a).

It is true, that at each time the gate 32 is switched the phase of (b) is controlled by and thus matched to the phase of (a). At all other times, such as 87, 88, 89, etc., the phase of (b) is the phase of (e), to which the clock is synchronized.

While this invention has been described in terms of a digital signal, it could be applied equally well to an analog signal.

While this invention has been described with some particularity, it will be clear that from the principles which have been described, one skilled in the art will be able to devise many other embodiments, all of which are considered to be part of this invention which is not to be limited to the abstract, the description or the drawings, but is to have the scope of the appended claim or claims, when construed to the full equivalents of each element.

What is claimed:

1. In an apparatus for synchronizing a clock signal to a phase-encoded (PE) signal, which apparatus includes a phase-locked-loop (PLL) sensitive to negative-going signals, and in which said PLL receives on a first input terminal a synchronizing signal which is a function of said PE signal, and receives on a second input terminal its own output, defined as a clock signal, the improvement, comprising:

a. first means for detecting differences in potential level between said PE signal and said clock signal; and b. second means responsive to said first means for inverting said PE signal, the output of said second means comprising said synchronizing signal.

2. The apparatus of claim 1 in which said first means comprises a NAND gate with one input being the inverted synchronizing signal, and the second input being the clock signal.

3. The apparatus of claim 1 in which said second means comprises a two position flip-flop controlling an exclusive OR gate.

* * * * *